UNITED STATES PATENT OFFICE.

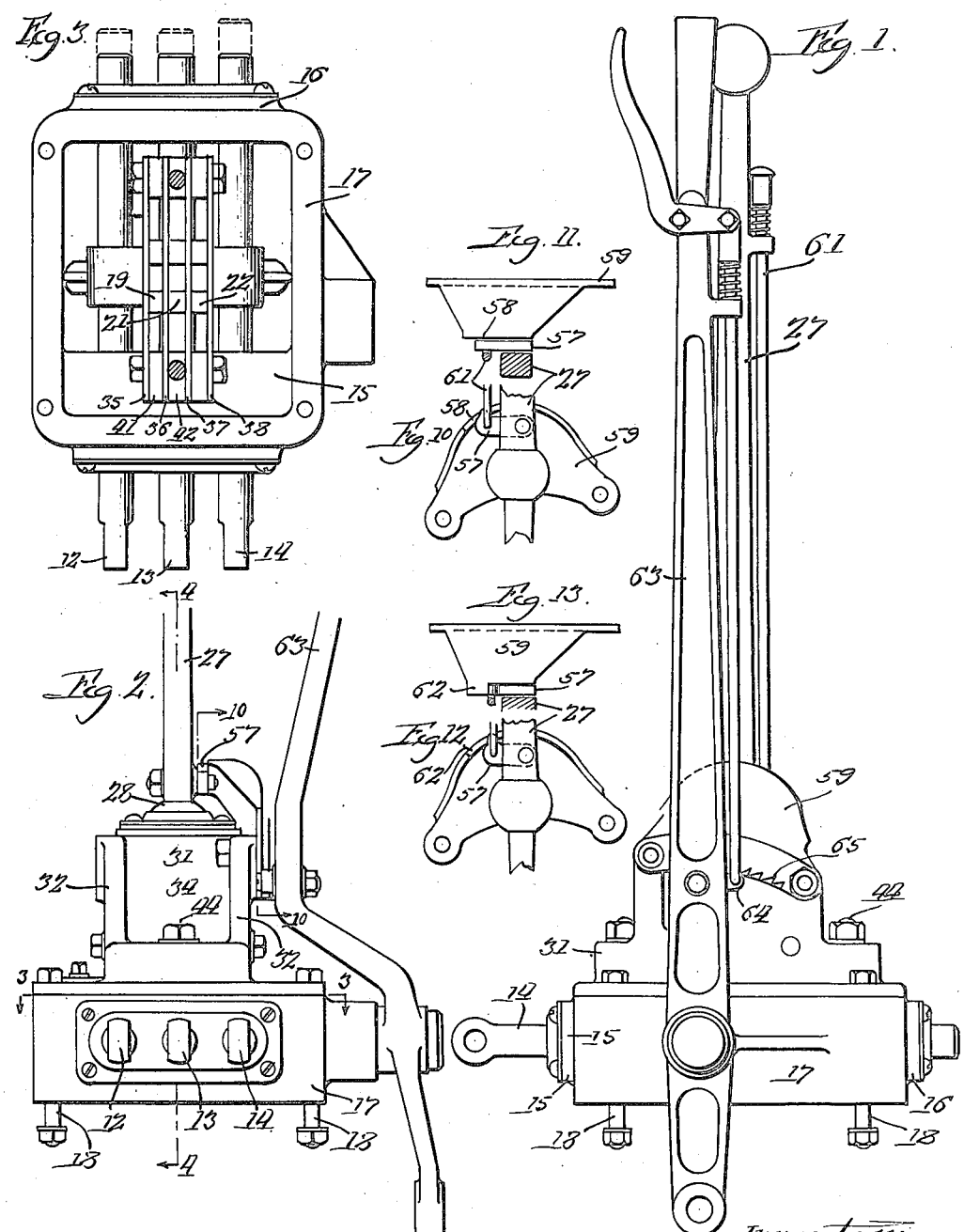

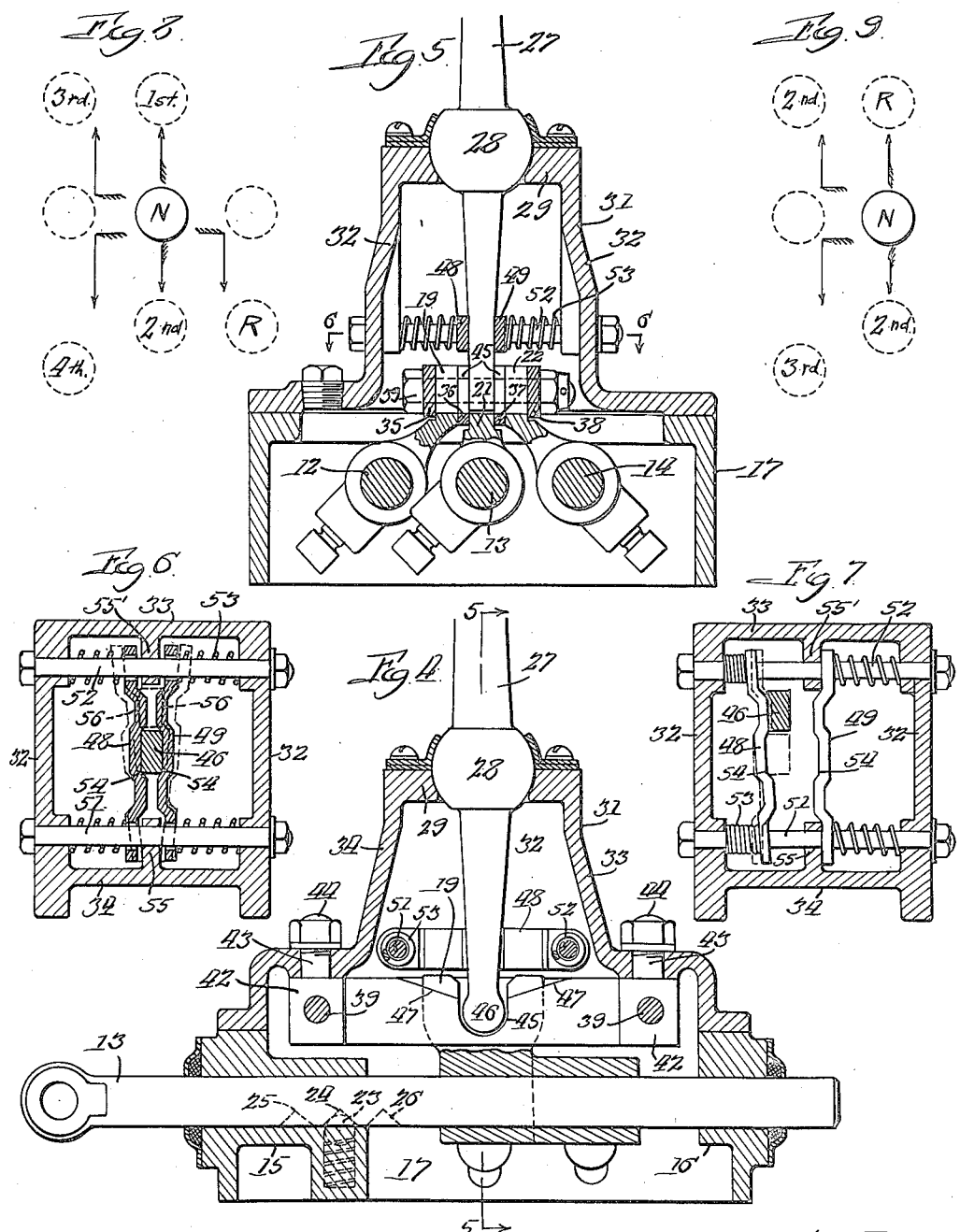

AXEL HJ. ASPROOTH, OF ROCKFORD, ILLINOIS, ASSIGNOR TO COTTA TRANSMISSION COMPANY, OF ROCKFORD, ILLINOIS, A CORPORATION OF ILLINOIS.

CONTROL SET FOR CHANGE-SPEED TRANSMISSION.

1,416,672.

Specification of Letters Patent. Patented May 23, 1922.

Application filed August 4, 1919. Serial No. 315,098.

*To all whom it may concern:*

Be it known that I, AXEL HJ. ASPROOTH, a citizen of the United States, residing at Rockford, in the county of Winnebago and State of Illinois, have invented certain new and useful Improvements in Control Sets for Change-Speed Transmission, of which the following is a specification.

This invention relates to lever control sets for change speed transmissions, and the primary object is to provide a control mechanism of generally improved and novel construction with the view to producing a commercially practical and successful control set which shall enable quick and easy selection of any speed desired without danger of accidental shifting or displacement of the parts from any position to which they have been moved by the operator, and which shall be so constructed as to be capable of economical production.

Another important object is the provision of a unit control set embodying such novel characteristics as to enable its use without substantial change for either a three or four speed transmission, or for any of a plurality of different types of transmissions. The advantages of a unitary control set of this character from a production standpoint are patent.

Another feature and object of my invention is the provision of a novel means for normally holding the control or change speed lever in neutral position and constantly imposing a tension on the lever irrespective of the position to which it is shifted, so as to function in preventing accidental displacement of the lever from any position to which it has been shifted by the operator.

Still another object resides in the provision of improved means permitting actuation of the control lever for effecting the reverse drive only upon compliance with certain conditions.

Other objects and attendant advantages will be appreciated as the invention becomes better understood by reference to the following description when considered in connection with the accompanying drawings, in which—

Figure 1 is a side elevation of a lever control set embodying my improvements;

Fig. 2, a rear end elevation of the control set;

Fig. 3, a plan view taken substantially on the line 3—3 of Fig. 2;

Fig. 4, an enlarged vertical sectional view taken substantially on the line 4—4 of Fig. 2;

Fig. 5, a cross-sectional view taken on the line 5—5 of Fig. 4;

Fig. 6, a plan sectional view taken on the line 6—6 of Fig. 5;

Fig. 7, a similar sectional view showing the control lever moved to the fourth speed position;

Figs. 8 and 9, diagrammatic views of the lever movement for four and three speed transmissions, respectively;

Fig. 10, a detail sectional view taken on the line 10—10 of Fig. 2;

Fig. 11, a plan view of the parts shown in Fig. 10;

Fig. 12, a view similar to Fig. 10, but showing the parts modified for a three speed transmission; and Fig. 13, a plan view of the parts shown in Fig. 12.

In the manufacture of change speed transmissions, especially of the selective type for motor vehicles of various descriptions, different speed combinations are employed in different transmission units, according to the character and nature of the particular motor vehicle with which the transmission is to be used. Instead of requiring a special control set for each different style of transmission unit, the present invention contemplates one adapted to be used with any of a plurality of different styles of transmissions, thus effecting a material saving in the production of transmissions. My improvements as will be presently seen, may also be used with a unit type transmission, that is, one in which the control set is mounted directly upon the transmission casing in juxtaposition to the change speed gearing, or with an individual control type, in which the control set is mounted at some distance from the transmission casing proper and is connected to the change speed gearing by suitable shifting rods or links. It will be understood, therefore, that my improvements have a broad application in this art and are in no way limited to the particular example shown in the drawing, which is merely for purpose of illustration.

Referring now to the drawings, it will be noted that I have shown an individual control set, that is, one separated from the transmission proper and adapted to actuate the change speed device thereof through the agency of suitable connections. These connections operated by shifting rods 12, 13 and 14 of the control set, are adapted for operating the shiftable elements of a transmission of the type shown in my Patent No. 1,262,618, which transmits four speeds and a reverse. One of the shifting rods would be omitted in a three-speed transmission, although it will be noted that the particular number of shifting rods or elements and their relative arrangement is not important to my present improvements. The shifting rods as shown, are mounted to slide lengthwise in bearings 15 and 16 formed integral with a casing section 17. Upon this casing, a control lever casing section is mounted carrying parts co-operating with the shifting rods. It will be manifest, therefore, that the main casing 17 might be formed integral with a casing which houses a change speed gearing, thus effecting a unit type transmission. As it is, an individual type control set is provided in which the main casing 17 is adapted to be secured by means of bolts 18 to any suitable support remote from the transmission so that the shiftable elements thereof are connected to the shifting rods 12, 13 and 14 through any suitable agency, not shown in the drawings.

The shifting rods, equipped with fixed upstanding parts such as bifurcated arms 19, 21 and 22 respectively, are adapted to be independently operated by the control lever. The bifurcated arms are normally held in lateral alignment in a neutral position by any suitable means, such for example as a spring-pressed ball or plunger 23 for each rod engaged in a notch 24 therein. Any one of the bifurcated arms may be shifted against the pressure of its spring-pressed ball to move its respective rod lengthwise in either direction to a position determined by engagement of the ball 23 in either the notch 25 or 26, as the case may be.

The control lever 27 has a ball and socket mounting 28 on the top wall 29 of the lever supporting casing 31, in turn mounted upon and secured to the main casing 17, covering the open top thereof. It will be observed that this casing section 31 is shaped to provide an upstanding reduced housing formed by the side walls 32 joined by the front and rear walls 33 and 34 respectively. The casing section 31 carries a plurality of dividing plates 35, 36, 37 and 38 in such laterally spaced and parallel relation above the shifting rods as to constitute guides between which the bifurcated arms 19, 21 and 22 are interposed and slidably guided. The dividing plates are rigidly secured together at their ends by bolts 39 which clamp the plates rigidly to the spacing blocks 41 and 42, the latter of which have upstanding threaded ends 43 extending through a horizontal wall of the casing section 31 and are equipped at their upper ends with nuts 44 which rigidly secure the dividing plates as a unit to said casing section. Viewing Fig. 5, it will be seen that the outer arms 19 and 22 are located in vertical planes spaced substantially inwardly from the longitudinal axis of their respective shifting rods, thus enabling compact arrangement of parts and the consequent reduction of cost to a minimum. It will be further observed from Figs. 4 and 5, that the innermost dividing plates 36 and 37 are respectively cut away at 45 in lateral alignment with the crotches of the upstanding shifting rod arms so that the operated end 46 of the control lever is free to move laterally from its neutral position indicated in full lines in these figures into co-operative relation with either the arm 19 or 22. These inner dividing plates are further cut away at 47 to prevent interference with the operated end of the control lever when the same is moved for shifting either the arm 19 or 22 lengthwise.

I have now aimed to provide novel means for not only facilitating accurate and positive manual operation of the control lever, but also for assisting in the movement of this lever and serving effectually to hold the lever against displacement from any position to which it has been moved by the operator. This means consists, preferably, of a pair of tension plates designated generally by characters 48 and 49, one disposed at each lateral side of the control lever adjacent to its operated end. These tension plates are loosely supported at their ends upon rods 51 and 52 interposed between and secured to the side walls 32 of the casing section 31. Compression springs 53 on the rods 51 and 52 constantly urge each end of the tension plates inwardly into engagement with the control lever, and inasmuch as the springs 53 constantly urge the tension plates against the lever, it follows that the lever will be effectually locked in neutral position against accidental displacement. The lever may, however, be shifted either laterally in either direction or forwardly or backwardly against the tension of the springs. When the upper or operating end of the lever is swung to the rear (to the left, Fig. 4) from the full-line position shown, the operated end 46 will be swung forwardly to the dotted line position indicated in Fig. 6, thereby spreading the tension plates against the pressure of the springs on the bolts 51. The tension plates thus assume a diverging position with the ends on the rod 52 pressed against a fixed stop or lug 55 integral with wall 34, and with the ends on the rod 51 yieldingly pressed against the control lever. The inwardly converging faces 56 of the tension plates thus serve as yielding inclined obstructions preventing return of the control lever to neutral position. It follows that the control lever is held in this shifted position both through the influence of the tension plates and the spring-pressed ball 23 located in the notch 24 of its shifting rod 13 and is thus effectually secured against displacement as might be occasioned by jarring of the machine or accidental brushing against the lever. When the upper end of the lever is swung in the opposite direction to its extreme forward position, the tension plates will be spread at the ends on the rod 52 and will serve to hold the lever in this shifted position, as will be obvious. It will be observed that when in any of these shifted positions the inner dividing plates 36 and 37 prevent lateral displacement of the operated end of the control lever. After the lever has been returned to neutral position it may be shifted laterally in either direction to engage its operated end in the crotch of either the arms 19 or 22. By swinging the upper end of the lever to the right, in the manner explained more fully hereinafter, the lower end will be moved to the dotted line position indicated in Fig. 7. In this position, it will be noted that the tension plate 48 alone is urged against the control lever after the plate 49 has been stopped by the lugs 55 and 55'. The upper end of the control lever may now be swung to the rear, moving its operated end forward to the full line position shown in Fig. 7 and causing the tension plate 48 to assume an oblique position. In this position, as also in the shifted position shown in Fig. 6, the spring pressure, especially the pressure on the end of the tension plate engaged by the lever, holds the latter against movement lengthwise between the dividing or guide plates 35 and 36. The action of the tension plates together with the spring-pressed locating balls 23 has the effect of securing a positive snappy shifting action of the control lever, because the lever upon manual operation to any position will be moved against the pressure of the tension plates, which together with the spring-pressed locating balls, will cause the lever to stop abruptly when a speed-changing position is reached.

In Fig. 8, I have illustrated diagrammatically the lever shift of the present control set. The circle "N" indicates the upper end of the control lever in neutral position. By swinging the lever forwardly to "1", the first speed is effected; rearwardly to "2", second speed; to the left and forwardly to "3", third speed; and rearwardly to "4", the fourth speed. The reverse is effected only after actuating a pawl in a manner to be presently described. Fig. 9 indicates the lever shift for a three speed transmission, in which case either the shifting rod 12 or 13 may be omitted, as superfluous. In such instance, however, the remaining parts would be the same except that the outer dividing plate on the side of the removed shifting rod would also be omitted. It should be understood, however, that the lever shift arrangements indicated in Figs. 8 and 9 are simply illustrative of a working example of my improvements, which latter are in no way limited to these particular examples.

Coming now to the reverse drive, this is effected in the four speed type transmission by shifting the rod 12. This operation requires movement of the operating end of the control lever to the right of the neutral position, viewing Fig. 8, and then backward to the position indicated by "R". It is desired to normally prevent shifting the control lever to the right from the neutral position, so that ordinarily the control lever simply operates in what is termed an H-slot, thus preventing confusion and possible accidents in operation. To this end I equip the control lever 27 just above its ball joint 28 with a pawl 57 normally disposed alongside of an arcuate stop 58 in the form of a flange integral with a bracket 59 rigidly secured to the casing section 31. Viewing Fig. 10, it will be observed that when the control lever is in neutral position, the pawl and stop 58 prevent shifting of the lever to the right; but by lowering the pawl beneath the stop 58 by pressing down on a push rod 61 associated with the control lever, the latter will be free to swing to the right to bring its operated end 46 into engagement with the arm 19 for shifting the rod to effect the reverse drive. The pawl 57 simply rides under the flange 58, while the control lever is shifted to reverse position, and when the lever is returned to neutral position the pawl automatically assumes its locking position under the influence of the spring on the push rod 61, as will be obvious. Following the use of the control set with either a three or four speed transmission, the same reverse lock is used for the three speed style, except that the shape of the pawl stop is changed. As will be apparent from Fig. 9, it is desired to normally lock the control lever against forward movement from its neutral position, and to this end the stop portion 58 of the bracket 59 is formed with an extension 62 in the path of the pawl, constituting a positive stop for preventing such forward movement of the lever. In order to throw in the reverse, the rod 61 is pushed down, thereby lowering the pawl 57 beneath the stop 62 and allowing free forward movement of the control lever.

A brake lever 63 is shown in connection with the control set and carries a locking pawl 64 adapted to engage with a notched face 65 secured to the casing section 31 by means of the bolts, which holds the bracket 59 in position.

From the foregoing, it will be manifest that I have provided a lever control set embodying characteristics which enable economical production of the same for a plurality of different styles of change speed transmissions. It will also be observed that the construction is especially designed and serves to promote accuracy and precision in changing speeds, and the prevention of accidents as might be occasioned by improper shifting of the control lever.

It is believed that this conveys a clear understanding of the principles of my invention and of the objects prefaced above, and while I have illustrated and described but a single working embodiment of my improvements as applied to a three and four speed transmission, it should be understood that various changes might be made in the construction and arrangement without departing from the spirit and scope of the invention as expressed in the appended claims, in which—

I claim:

1. In a lever control of the character described, the combination of shiftable devices, a control lever whose operated end is movable in transverse planes, in one for operative connection with certain of said devices and in the other for shifting the devices, and a tension plate mounted independently of said shiftable devices and normally urging the operated end of the lever toward neutral position and yieldingly opposing movement of the lever to any shifted position.

2. In a lever control of the character described, the combination of shiftable devices, a control lever whose operated end is movable in one plane for selectively engaging any of said devices and in a transverse plane for shifting such selected device, and spring-pressed means normally holding the lever in a neutral position and yieldingly opposing movement of the lever both in its selective plane and to its shifted position in the transverse plane.

3. In a lever control of the character described, the combination of shiftable devices, a control lever whose operated end is movable in transverse planes, a tension plate at each side of the lever, and springs urging the plates against the lever for normally holding it in neutral position, the plates being so mounted as to be respectively retractable laterally against the spring pressure by movement of the lever to selectively engage one of said devices and being non-movable lengthwise with respect to the shifting devices whereby to yieldingly oppose shifting movement of the lever in both planes.

4. In a control set of the character described, the combination of a ball and socket control lever, the operated end of which is adapted to be shifted in laterally offset planes for effecting different speed changes, and a tension plate co-operating with said operated end of the lever and shaped to normally hold the lever in neutral position and present an inclined face forming a yielding obstruction to the return of the lever from an operated position to said neutral position.

5. In a control set of the character described, the combination of a ball and socket control lever, the operated end of which is adapted to be shifted in laterally offset planes for effecting different speed changes, and a tension plate on each lateral side of the operated end of the control lever, so mounted as to be yieldingly retracted by lateral shifting of the lever and presenting an oblique face to the lever when the same is shifted lengthwise to a speed change position for yieldingly preventing return movement of said lever to neutral position.

6. A control set of the character described comprising a plurality of shifting rods, a control lever having a ball mounting intermediate its ends and co-operable at its operated end with said shifting rods for shifting the same, and a tension plate at each side of the lever intermediate its ball mounting and operated end and constantly urged toward the lever but permitting lateral shifting thereof in each direction and lengthwise shifting while in such laterally shifted position, the tension plates being non-movable in said lengthwise direction and constituting, after the lever has been shifted lengthwise, a means for yieldingly opposing return of the lever to neutral position.

7. A control set of the character described comprising a plurality of shifting rods, a control lever having a ball mounting intermediate its ends and co-operable at its operated end with said shifting rods for shifting the same, a tension plate at each side of the lever intermediate its ball mounting and operated end and shaped to hold the lever against movement in a rod-shifting direction, and springs constantly urging the tension plate toward the lever, the plates being retractable laterally against the spring pressure to permit lateral movement of the lever in a shifting direction against the spring pressure.

8. A control set of the character described comprising a plurality of shifting rods, a control lever having a ball mounting intermediate its ends and co-operable at its operated end with said shifting rods for shifting the latter, a tension plate at each side of the lever intermediate its ball mounting and operated end, means supporting the tension plates at the front and rear ends thereof and permitting the plates to move in a horizontal plane toward and from the lever in its neutral position, and springs urging the plates toward the lever for normally holding the latter in neutral position and constantly exerting a lateral pressure on the lever in any shifted position thereof.

9. A lever control for change speed transmissions comprising a plurality of shiftable rods, each equipped with an upstanding bifurcated arm, stationary guides between which said arms are slidable, means yieldingly maintaining the shifting rods in neutral position with the bifurcations of said arms in lateral alignment, a ball and socket control lever, the operated end of which is adapted to be moved into the crotch of any of said shifting-rod arms, and a member yieldingly urged against each lateral side of the control lever and shaped to provide obstructions holding the shifting lever in neutral position but permitting the lever to be shifted by a pressure greater than the effect of said pressure and obstructions.

10. A lever control for change speed transmissions including a control lever having a ball and socket mounting and co-operable at its lower end with shiftable devices, a rod disposed at the front and another at the rear of the lever intermediate its ball and socket mounting and operating end and extending in a plane transverse to the longitudinal shifting plane of the lever, a member at each lateral side of the lever interposed between and loosely supported upon said rods, springs on the rods constantly urging said members toward and into engagement with the lever, said means being shaped to hold the lever in a neutral position, but permitting shifting of the lever in either a longitudinal or transverse plane against the pressure of the respective springs compressed by the particular shifting movement.

11. A shifting-lever device for change speed transmission comprising, a plurality of longitudinally slidable shifting rods each equipped with an upstanding bifurcated arm, stationary guides between which said upstanding arms are interposed and guided during their shifting movement against lateral displacement, means yieldingly holding the shifting rods in a neutral position with said bifurcated arms in lateral alignment, a ball and socket control lever the operating end of which is normally disposed in transverse alignment with the crotches of said arms, whereby the operated end of the lever is adapted to be moved transversely into engagement with any of said bifurcated arms and intermediate said guides to permit longitudinal shifting movement of the lever for so shifting the arm with which it is associated.

12. A lever set of the character described comprising a casing having side walls and a top wall and open at its bottom, a control lever having a ball portion intermediate its ends mounted in a socket in said top wall, the lower end of the lever being shiftable laterally to different planes and movable lengthwise in such planes for shifting purposes, a rod at the front and at the rear of the lever, interposed between and mounted on said side walls of the casing transverse to the shifting planes of the lever, a tension plate on each side of the lever and mounted at its ends on said rods so as to be freely slidable thereon in a direction transverse to said planes, and springs on the rods constantly urging the plates toward the lever, whereby said plates normally hold the lever in neutral position and exert a lateral yielding pressure on the lever in any shifted position thereof.

13. In a lever control set of the character described, the combination of an open top casing equipped with a plurality of shifting rods provided respectively with an upstanding part, a lever-supporting casing section detachably mounted on the first casing overlying the open top thereof and equipped with a plurality of dividing plates interposed between which said upstanding parts of the rods are slidable, and a control lever mounted on said casing section with its operated end in co-operative relation with said upstanding parts for operating the latter to shift the rods.

14. In a lever control set for change speed transmissions, the combination of an open top casing equipped with a plurality of shifting rods each having an upstanding part, a lever-supporting casing section detachably mounted on the first casing and equipped with a plurality of dividing plates between which said upstanding parts are interposed, and a control lever mounted on said casing section with its operated end movable into co-operative relation with any of said upstanding parts and adapted to be shifted lengthwise of and between said dividing plates for shifting any rod, the upstanding part of which is engaged by the lever.

15. In a control set of the character described, the combination of a ball and socket control lever, the operated end of which is adapted to be shifted in laterally offset planes for effecting different speed changes, a plurality of shifting rods in laterally spaced relation below the control lever and each equipped with an upstanding arm or part adapted to be operably engaged by the control lever, one of said upstanding parts being laterally offset with regard to its shifting rod so as to bring the adjoining upstanding parts into closer relation, and stationary dividing plates between and at the outer sides of the upstanding parts defining permanent guideways for guiding such parts and holding the shifting rods against oscillation 16. A lever control for change speed transmissions comprising a housing having bearings for the reception of shifting rods, a plurality of rods slidable lengthwise in said bearings and each equipped with an upstanding bifurcated arm, a lever supporting casing section bolted to the top of said shifting rod casing, a plurality of laterally spaced guide plates rigidly secured to and supported by the lever-suporting casing parallel with said shifting rods, the upstanding bifurcated arms being interposed between and guided by said plates, means for yieldingly maintaining said bifurcated arms in neutral position in lateral alignment, a ball and socket lever mounted on said lever-supporting casing above said guide plates with its operated end in lateral alignment with the crotches of said arms, whereby the lever may be moved laterally to position its operated end in the crotch of any of said arms and shifted longitudinally between the guide plates for correspondingly shifting the rod of the respective arm.

17. In a lever control of the character described, the combination of a plurality of laterally spaced shiftable rods, a control lever whose operated end is adapted to be selectively engaged with any of said rods for shifting it lengthwise, and means non-movable lengthwise with the rods normally holding the lever in neutral position and yieldingly opposing lateral shifting of the lever when selectively engaging any of the rods and yieldingly opposing movement of the lever during operation thereof for shifting any rod.

18. The combination of a plurality of shiftable devices, a control lever movable in transverse planes, in one of which to selectively engage any of said devices and in the other to shift such device, and tension plates at opposite sides of the lever non-movable lengthwise with said devices, normally holding the lever in neutral position and permiting lateral shifting thereof against the tension when selecting and shifting a given device.

19. In a lever control of the character described, the combination of a plurality of laterally spaced shifting rods, a control lever shiftable in transverse planes, in one for operatively connecting with either of said rods and in a transverse plane for shifting the selected rod, and a spring-pressed member normally holding the control lever in neutral position and opposing lateral movement of the lever for connecting with one of said rods but non-movable lengthwise with such rod.

AXEL HJ. ASPROOTH.